(12) United States Patent
Kozak, III

(10) Patent No.: US 7,470,873 B2
(45) Date of Patent: Dec. 30, 2008

(54) DESALINIZATION SYSTEM AND METHOD

(75) Inventor: Andrew F. Kozak, III, Media, PA (US)

(73) Assignee: Aquitic Technology, Inc., West Chester, PA (US)

( * ) Notice: Subject to any disclaimer, the term of this patent is extended or adjusted under 35 U.S.C. 154(b) by 0 days.

(21) Appl. No.: 11/693,332

(22) Filed: Mar. 29, 2007

(65) Prior Publication Data

US 2008/0237107 A1 Oct. 2, 2008

(51) Int. Cl.
*H05B 1/02* (2006.01)
(52) U.S. Cl. .................. 219/201; 219/494; 210/800
(58) Field of Classification Search ................ 219/201, 219/490, 494, 496, 497; 210/799, 800, 513
See application file for complete search history.

(56) References Cited

U.S. PATENT DOCUMENTS

| | | | |
|---|---|---|---|
| 110,638 A | 1/1871 | Eaton | |
| 783,880 A | 2/1905 | Malcom | |
| 839,926 A | 1/1907 | Griffith | |
| 1,297,171 A | 3/1919 | Holley et al. | |
| 1,678,819 A | 7/1928 | Koch | |
| 2,009,510 A | 7/1935 | Mobley | |
| 2,182,428 A | 12/1939 | Fladmark | |
| 2,307,078 A | 1/1943 | Reed | |
| 2,353,382 A | 7/1944 | Barrett | |
| 2,976,224 A | 3/1961 | Gilliland | |
| 2,985,305 A | 5/1961 | Nock et al. | |
| 3,151,677 A | 10/1964 | Thompson et al. | |
| 3,296,122 A | 1/1967 | Karassik et al. | |
| 3,647,624 A | 3/1972 | Evenson | |
| 3,856,492 A * | 12/1974 | Klass ........................... | 62/533 |
| 3,925,149 A | 12/1975 | Erwin | |
| 4,452,671 A | 6/1984 | Oakes | |
| 4,521,312 A | 6/1985 | Anderson | |
| 4,778,001 A * | 10/1988 | Reed ..................... | 165/104.31 |

(Continued)

FOREIGN PATENT DOCUMENTS

EP 0119014 9/1984

(Continued)

OTHER PUBLICATIONS

Joseph M. Desimone, "Practical Approaches to Green Solvents", Green Chemistry Viewpoint, www.sciencemag.org, Science vol. 397, Aug. 2, 2002, p. 799-803.

*Primary Examiner*—Mark H Paschall
(74) *Attorney, Agent, or Firm*—Rosenberg, Klein & Lee

(57) ABSTRACT

A desalinization system for converting a saltwater solution to a purified water composition is provided. The desalinization system (1000) has a primary tank (40) which contains a heated silicone composition within a heated silicone composition zone (210) and water globules (30) which pass through the heated silicone zone (14) to form an initially treated or initially heated water zone (60) within the primary tank (40). The initially heated water zone (60) then is fluidly displaced through a heating conduit (115) for passage into a secondary tank (120) in the form of steam (180). The steam (180) then condenses within a condensation zone (200) and forms a purified water zone (140) within secondary tank (120). The water within the purified water zone (140) of the secondary tank (120) may be removed through a water output line (150) from secondary tank (120).

13 Claims, 1 Drawing Sheet

U.S. PATENT DOCUMENTS

| | | |
|---|---|---|
| 5,145,586 A | 9/1992 | Taggart et al. |
| 5,294,351 A | 3/1994 | Clum et al. |
| 5,304,303 A | 4/1994 | Kozak, III |
| 5,315,921 A | 5/1994 | Davis |
| 5,464,529 A | 11/1995 | Kozak, III |
| 5,552,057 A | 9/1996 | Hughes et al. |
| 5,597,493 A | 1/1997 | Torini |
| 5,891,330 A | 4/1999 | Morris |
| 6,054,060 A | 4/2000 | Kozak, III |
| 6,164,458 A | 12/2000 | Mandrin et al. |
| 6,287,084 B1 * | 9/2001 | Kirsten ..................... 417/228 |
| 6,699,369 B1 * | 3/2004 | Hartman et al. ............... 203/11 |
| 6,919,034 B2 | 7/2005 | Kozak, III |

FOREIGN PATENT DOCUMENTS

| | | |
|---|---|---|
| GB | 1242875 | 8/1971 |
| GB | 1262458 | 2/1972 |

* cited by examiner

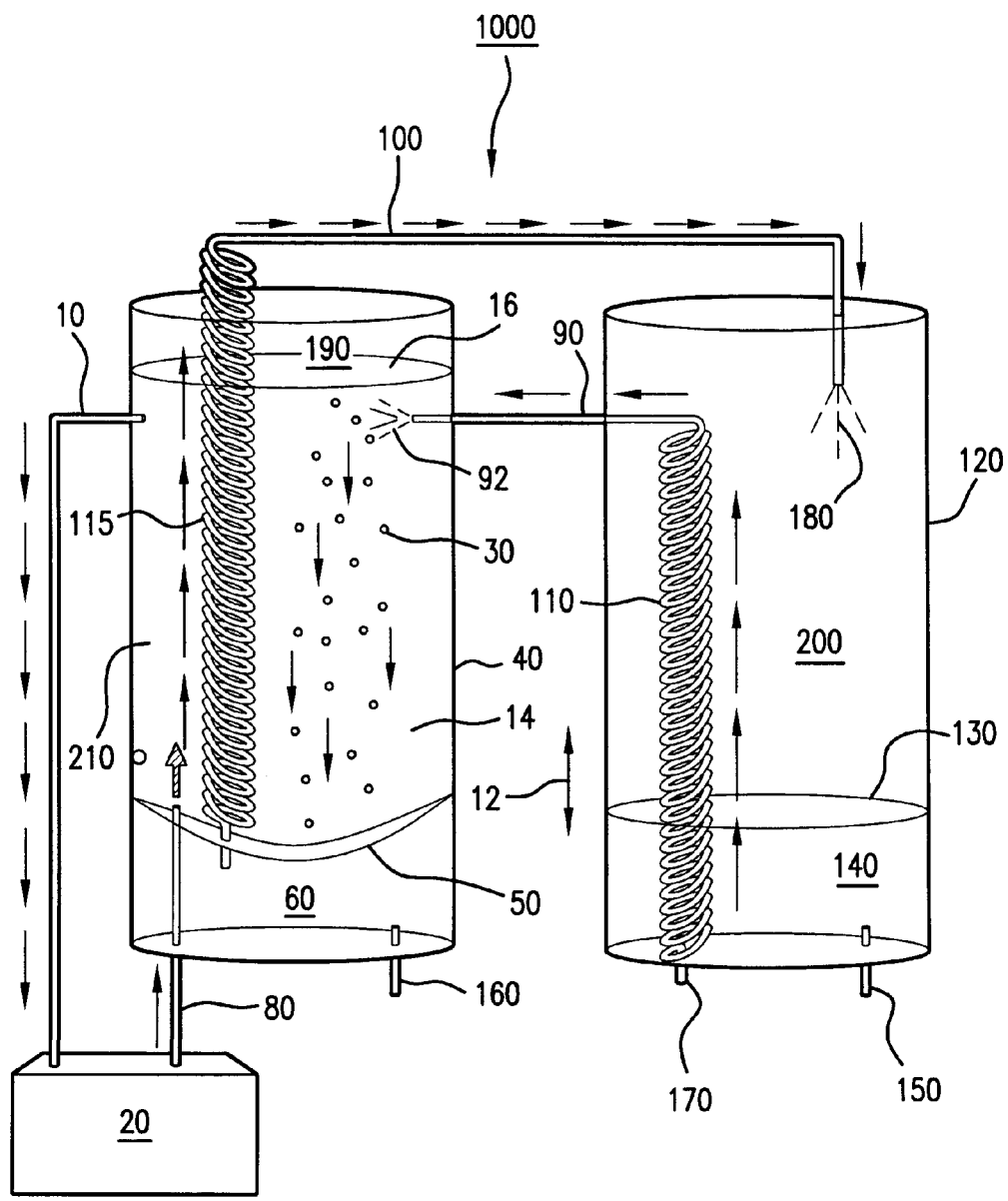

DESALINIZATION SYSTEM AND METHOD

BACKGROUND OF THE INVENTION

1. Field of the Invention

This invention directs itself to desalinization systems and methods for converting a saltwater solution to a purified water solution. Still further, this invention directs itself to a liquid purification system where two immiscible liquids namely water and a silicone composition are used for chemical reaction isolation and liquid-to-liquid thermal heat transport between the liquids.

Still further this invention relates to a liquid purification system where a heated silicone composition is inserted into a primary tank where it is in heat transport with water globules which pass through the heated silicone composition in a heated silicone zone of the primary tank to provide an initially heated water zone within the primary tank which is independent of and separated from the heated silicone zone due to the immiscibility of the liquids.

Still further, this invention relates to a liquid purification system where preheated saltwater or polluted saltwater is passed by gravity assist through an immiscible fluid composition to heat the water globules passing through the immiscible fluid.

Still further, this invention directs itself to a system where further preheated water contained within a water zone is passed through both a heating conduit and a primary conduit for insertion into a secondary tank where further heat exchange is actuated between steam and the incoming polluted water to both preheat the initial saltwater solution and to condense the steam within a condensation zone of the secondary tank.

2. Description of the Prior Art

Liquid purification systems and methods therefore are known in the art. The best prior art known to the Applicant includes U.S. Pat. Nos. 6,054,060 and 6,919,034.

U.S. Pat. No. 6,054,060 is directed to a liquid purification system and is particularly directed to decontamination of microbe infested liquids. The system includes a tank for containing purifying liquid compositions and microbe infested liquids in a purifying chamber of the tank where the purifying liquid composition and the microbe infested liquid are immiscible each with respect to the other.

Electrical heating heats the purifying liquid composition and the microbe infested liquid is then passed through the heat purifying liquid composition for destroying microbes contained therein. However, the reference is particularly useful with the liquid purifying composition being formed of an olive oil compound. Olive oil may have the tendency of loosing its chemical characteristics over a period of time. It is preferable to have a stable long lasting purifying liquid composition in the nature of silicone compositions within a predetermined Centi-stoke range of 100-1000 rather than olive oil compositions since such provides for greater stability and does not lose its immiscibility characteristics over periods of time and is further generally not dependent upon external characteristics.

Further, such prior systems of this nature require a heating element to be inserted within the liquid purifying composition which has the added disadvantage of heating the contained liquid to a point which would not allow for efficient liquid-to-liquid heat transport. Prior art systems do not use a feedback cycle to a boiler for efficiently heating the liquid purifying composition.

U.S. Pat. No. 6,919,034 is directed to a system and method for separating immiscible fluids. This system provide for a separation medium which may be formed of compositions such as silicon fluids, however, such does not provide for silicone compositions within the Centi-stoke range of 100-1000 which is the kinematic viscosity range necessary for providing sufficient dwell time of the immiscible fluids each with respect to the other to provide the necessary heating which will allow desalinization systems to heat the incoming saltwater to a temperature can be effectively converted into steam.

Such prior art systems do not use a feedback concept for maximizing the efficiency of an externally positioned silicone composition heater or boiler. Further, such prior art systems, although providing for some preheating aspects of a closed cycle system, do not provide for continued preheating of the subject system concept.

SUMMARY OF THE INVENTION

The present invention directs itself to a desalinization system for converting a saltwater solution to a purified water composition. A primary tank is provided which includes both a silicone heating zone and an initially heated saltwater zone. The silicone heating zone is separated from the initially heated saltwater zone by a meniscus due to the immiscibility of a silicone composition and saltwater solution which passes through the silicone composition in the form of water globules.

A secondary tank is provided for charging the primary tank with initially heated or preheated saltwater solution. A silicone boiler is located external the primary tank for charging a heated silicone composition into the silicone heating zone within the primary tank. A heating conduit is located within the primary tank for passage of the initially heated saltwater contained within the initially heated saltwater zone to a primary conduit. The heating conduit has a lower portion extending into the initially heated saltwater zone and the initially heated saltwater solution is then secondarily heated to steam in the heating conduit in the silicone heating zone of the primary tank. The secondarily heated water is then charged into the secondary tank as steam through a primary conduit where the steam is condensed to a purified water solution while simultaneously preheating the incoming polluted or saltwater.

An object of the subject system and method is to convert a polluted or saltwater solution to a purified water solution in an efficient manner.

A further object of the subject system and method is to efficiently heat saltwater solutions through heat transport between immiscible liquids.

A still further object of the subject system and method is to charge preheated saltwater solutions in the form of globules into a primary tank where the globules are surrounded by a silicone composition bath.

A still further object of the present system and method is to pass saltwater globules through a silicone composition bath through gravity assist in order to heat the water globules through a liquid-to-liquid heat transport.

Still further, an object of the subject system and method is to charge a heating conduit with a preheated and partially purified saltwater system to a temperature approximating the boiling point of water to produce steam.

Another object of the subject system and method is to charge a secondary tank with steam for condensation therein while simultaneously acting in heat transport with an incoming saltwater solution to preheat the saltwater solution prior to insertion into the primary tank and condense the steam into a purified water solution where it is collected in a lower section of the secondary tank.

Another object of the subject system and method is to provide a silicone composition boiler external to a primary tank for heating the silicone composition in a silicone heating zone within the primary tank.

Another object of the subject system and method is to provide a feedback to an externally located silicone composition boiler to permit charging of the silicone boiler with silicone composition which has previously interacted in heat transport with liquid globules within the silicone heating zone of the primary tank.

BRIEF DESCRIPTION OF THE DRAWING

The FIGURE is a schematic drawing of the desalinization system showing the combination of the secondary and primary tanks of the desalinization system to provide a purified water solution.

DETAILED DESCRIPTION OF THE PREFERRED EMBODIMENTS

Referring now to the FIGURE, there is shown desalinization system 1000 for purifying a liquid being input into the desalinization system 1000 through water input line 170. The purification of the liquid entering input line 170 may have numerous contaminants, however, of importance in overall concept is the removal of salt from a saltwater solution to provide purified water which may be potable useful for human ingestion.

System 1000 is operationally based upon the principle of liquid to liquid heat exchange where polluted liquid passes through a silicone composition bath and absorbs heat to raise the temperature of the polluted liquid in a transient manner throughout a predetermined path and time interval to provide raising of the temperature in an optimally efficient manner.

Of importance is the fact that the interface between a heated silicone composition and the polluted water defines an immiscible barrier each with respect to the other. In this manner, the polluted water does not enter into solution with the silicone heated composition and maintains separation with the heated silicone composition throughout the purification process.

Additionally, it has been found that in order to allow the polluted water to pass through the heated silicone composition bath in an optimal manner, the kinematic viscosity of the silicone composition is to be maintained between 100-1000 Centi-stokes. This provides for a time duration of liquid to liquid heat transfer which permits the heat transport to heat the polluted water to a sufficient temperature which will allow removal of the pollutants within the polluted heated water.

Of further importance to the basic concept is that immiscible fluids must be used in the overall process to interact with each other in a manner where different specific gravities of the compositions allow for passage of the polluted water through the silicone composition in an independent and non-mixing manner. Since water has a specific gravity of 1.0 and the silicone composition has a specific gravity approximating 0.96, the immiscible water in the form of globules can pass through the silicone composition. The specific gravity of the water approximating 1.0 essentially provides for a heavier composition of water than the silicone having a specific gravity approximating 0.96. Since the silicone composition being used in this invention has the lower specific gravity, the water will pass through the silicone composition bath by gravity assist and passes to an initially heated saltwater zone 60 as will be detailed in following paragraphs.

Of further importance is the fact that the polluted water solution entering the heated silicone bath defined by heating zone 14 of primary tank 40 is brought in as a liquid and then rapidly expands since it meets a viscous environment, i.e., the heated silicone composition 210 within the silicone heating zone 14 of the primary tank 40.

This rapid expansion causes polluted water globules 30 to be formed within the silicone heating zone 14 of primary tank 40. The globules of liquid 30 are surrounded by the heated silicone bath within the silicone heating zone 14 providing a relatively large surface area for heat transport between the heated silicone composition within the silicone heating zone 14 to the individual water globules 30.

Due to the fact that the water globules 30 have a higher specific gravity than the heated silicone composition within silicone heating zone 14, the water globules 30 then pass through the heated silicone bath and still further since the water globules 30 are immiscible in the silicone bath composition, such pass to initially heated saltwater zone 60 of primary tank 40 in an intact state without any chemical reaction with the heated silicone bath.

In experiments run, based upon heat exchange characteristics between a fluid to fluid contact (in accordance with the subject invention concept) and heat exchange between a shell and tube type contact, there has been found a dramatic increase in the efficiency of the heat transport between the heated silicone composition and the immiscible water passing therethrough.

In a typical arrangement, where the silicone composition has been charged to a temperature approximating 235° and the polluted water entering and passing through the heated silicone composition enters at approximately 62°, there has been found a 90° F. rise over 40 inches (vertical direction) of a fluid to fluid contact which raises the temperature to approximately 150° F. where the silicone composition has been maintained at varying viscosities including viscosities extending between 100-1000 Centi-stokes.

In opposition, where a shell and tube contact heat transfer has been used, there is a 62° rise over 600 inches of shell and tube contact to raise the water temperature to 212° F. for the same water and silicone composition parameters.

Returning now to the FIGURE, desalinization system 1000 includes primary tank 40 having silicone heating zone 210 which extends from meniscus 50 to an upper heated silicone surface 16. The silicone heating zone 210 provides for a silicone composition bath where water globules 30 (as will be further described in following paragraphs) are heated. Primary tank 40 extends in vertical direction 12 to allow the water globules 30 to pass through the heated silicone bath 210 through gravity assist.

In overall system concept, contaminated or polluted water which may be in the form of saltwater is received from an external source and is inserted to secondary tank 120 through water input line 170. The polluted or saltwater passes through secondary conduit 110 located within secondary tank 120 for passage to saltwater conduit 90 for egress of the saltwater solution after preheating (as will be described in following paragraphs). Secondary conduit 110 may be in the form of a helically directed coil to allow added surface area for heat transport and preheating of the saltwater solution prior to insertion into primary tank 40.

As will be detailed in following paragraphs, the initial water solution being input to secondary tank 120 through water input line 170 is in heat exchange relationship with steam 180 to preheat the saltwater solution prior to insertion into primary tank 40.

The preheated saltwater solution then passes through saltwater conduit 90 external to secondary tank 20 and is in fluid communication with primary tank 40 to pass initially heated saltwater solution 92 into primary tank 40. Due to the fact that the silicone composition has a relatively high viscosity, the initially heated saltwater solution 92 rapidly expands in the heated environment of heated silicone zone 210 and forms water globules 30.

Since the silicone composition is immiscible with respect to the water globules 30, the water which is formed into individual globules then pass through the heated silicone composition within primary tank 40 through gravity assist in vertical direction 12.

The water globules 30 being individual in nature provide for a high surface area to heatedly interact with the heated silicone composition within heated silicone zone 210 and efficiently heats the water globules 30 to a temperature approximating 150° F. over a 42" vertical displacement.

The water globules 30 pass into initially heated saltwater zone 60 of primary tank 40. Due to the immiscibility of water and the silicone composition, there is a meniscus 50 formed which separates the initially heated saltwater zone 60 from the heated silicone zone 210 within the primary tank 40. Thus, the initially heated water is collected within heated saltwater zone 60 to provide a distinct volume of the primary tank 40 which is separated and independent from the heated silicone zone 210.

As previously described, one of the important aspects of the subject invention is due to the immiscibility of silicone and water. Silicone may be defined as one of a group of siloxane polymers based upon a structure consisting of alternate silicon and oxygen atoms with various organic radicals attached to the silicon. The choice of silicone compositions is that such generally show a specific gravity of approximately 0.96 as opposed to the specific gravity of water being 1.0. The fact that the silicone composition is somewhat lighter than the water is of importance in allowing the water to pass through the silicone composition by gravity assist.

Still further, the immiscibility allows the primary tank 40 to be divided into separate and independent zones namely the heated silicone zone 210 and the initially heated saltwater zone 60 in a manner where there is no interaction between the zones as separated by the meniscus 50. The kinematic viscosity of the silicone composition has been found to be optimally useful between 100-1000 Centi-stokes. Where the kinematic viscosity of the silicone composition is above 1000 Centistokes, characteristic parameters inhibit the heat transport in the liquid to liquid transfer as herein described.

In order to maintain a sufficiently high heat transport between the silicone bath 210 and the water globules 30, silicone boiler 20 is provided for charging primary tank 40 with the heated silicone composition. Silicone boiler 20 contains silicone which is heated to a temperature approximating 235° F.-250° F. Silicone boiler 20 may be one of a conventional number of boilers or heaters which heat the contained silicone through electrical resistance heating, gas heating or any other well known commercial type of heating. The only thing of importance with regard to the silicone boiler 20 is that it have a structural capability sufficient to contain the silicone composition and accept the elevated temperature of the heated silicone.

Once heated in the silicone boiler 20, the heated silicone is charged into silicone heating zone 210 of primary tank 40 through input line 80. The heated silicone composition is inserted directly into heated silicone zone 210 of primary tank 40 wherein the silicone heating zone extends between upper silicone surface 16 and meniscus 50. In this manner, a continuous amount of heated silicone composition is inserted into heated silicone zone 210.

In order to maximize the efficiency of silicone boiler 20, feedback line 10 is shown to extend from an upper portion of heated silicone zone 210 into silicone boiler 20. In this manner a continuous recycling or feedback of heated silicone composition is provided to silicone boiler 20. The heated silicone composition is thus heated in silicone boiler 20, inserted into heated silicone zone 210, is in heat transport contact with water globules 30 and is then removed from primary tank 40 through feedback line 10 which is positioned below upper silicone surface 16. The continuous cycling of the heated silicone permits the silicone boiler or heater 20 to efficiently use the energy input to it for reheating of the silicone composition.

Input line 80 extending from silicone heater or boiler 20 extends directly into heated silicone zone 14 in order to maintain a somewhat purified amount of water passing through heating conduit 115. However, it is to be understood that due to the immiscibility between the initially heated saltwater in the zone 60 and the silicone composition, that the silicone composition may be inserted either above meniscus 50 or below meniscus 50. Where the silicone is inserted below the meniscus 50, the silicone composition will rise into the heated silicone zone 210. Some contamination may occur if the silicone enters heating conduit 115 and thus it is preferred that the heated silicone from boiler 20 be inserted directly into heated silicone zone 210.

Heating conduit 115 extends in vertical direction 14 and extends into initially heated saltwater zone 60. The initially heated saltwater within zone 60 is then passed through heating conduit 115 as is seen. Heating conduit 115 may be a coiled conduit in order to allow continuous heating of the water being driven through heating conduit 115. The added length of the coiled heating conduit 115 permits greater heat transport between the heated silicone bath in heated silicone zone 210 and the initially heated saltwater passing therethrough from zone 60. The heat transport between the heated silicone composition in heated silicone zone 210 raises the temperature of the initially heated saltwater to approximately 212° F. egressing primary tank 40. The initially heated water within heating conduit 115 is raised to a point where the water turns to the steam phase and then passes to primary conduit 100 in fluid communication with heating conduit 115 for insert into secondary tank 120.

Steam 180 exits from primary conduit 100 in secondary tank 120. Steam 180 is condensed within secondary tank 120 into a substantially purified water zone 150 defined by water line 130 existing in a lower section of secondary tank 120.

In order to provide some preheating of the initially polluted water entering tank 120 through water input line 170, secondary conduit 110 is seen to be in heat transport relation to the steam 180 in condensation zone 200. In this manner some heat of the steam 180 is transferred to the incoming saltwater and preheats the saltwater for egress from secondary tank 120 through saltwater conduit 90.

In this manner, purified water is collected in purified water zone 140 of secondary tank 120 and may be dispensed through purified water output line 150 at the discretion of a user. The system as herein described provides for a maximization of the heat transport between impure water and a heated silicone composition while preheating the incoming saltwater or polluted solution to provide a system which is compact, devoid of excessive moving elements can be used in a portable manner.

The subject system additionally provides for a desalinization method to purify water. The method includes establishing a vertically directed primary tank 40 which contains a heated silicone composition within a silicone zone 210 of the primary tank 40.

The primary tank 40 is then charged with a preheated saltwater solution 92 into heated silicone zone 210 at an upper section of primary tank 40 below upper silicone surface 16.

Due to the fact that the initially heated saltwater solution 90 expands rapidly in the viscous heated silicone composition within the heated silicone zone 210, water globules 30 are formed to maximize the surface area for heat transport between the heated silicone composition within heated silicone zone 210 and the water globules 30. Further, due to the fact that there is a difference in the specific gravity of the silicone composition and the water globules 30, the water globules pass through the heated silicone composition or heated silicone bath in the silicone heating zone 210 through gravity assist to the initially heated saltwater zone 60.

Once the globules of water have entered the initially heated water zone 60, a meniscus 50 is formed between the water zone 60 and the silicone zone 210 due to the immiscibility of the silicone composition and the water contained within water zone 60.

The initially heated water solution within water zone 60 is then fluidly driven through heating conduit 115 to once again pass through heated silicone zone 210 and further heat the water to a temperature approximating the boiling point of water to produce steam.

Steam is then passed through primary conduit 100 which is in fluid communication and coupled to heating conduit 150 and egresses as steam 180 in secondary tank 120.

Steam 180 then passes through condensation zone 200 where there is heat transport between the steam and initial water being input to desalinization system 1000 to have the two-fold effect of allowing condensation of the steam 180 while simultaneously heating the incoming polluted water passing through secondary conduit 110. Substantially purified water is formed in purified water zone 140 of secondary tank 120 and then can be removed through water output line 150.

The steps of fluidly driving the initially heated saltwater solution includes the step of charging the silicone heating zone 210 with the heated silicone composition at a temperature approximating 235° F. Heating of the silicone composition includes the step of heating the silicone composition 20 within the silicone boiler 20 and then feeding back a portion of the silicone composition from the silicone heating zone 210 where the silicone composition is cooled through the interaction of the heat transport with the water globules 30 passing through primary tank 40 through gravity assist.

Feedback of the partially cooled silicone composition is provided through feedback line 10 which extends from an upper section of primary tank 40 directly into silicone boiler 20. Silicone boiler 20 is generally maintained external to primary tank 40 for ease of maintainability of the operating systems and further to accommodate easy access to the silicone boiler 20.

The charging of the vertically directed primary tank 40 with the preheated water solution includes preheating of the initial saltwater solution being inserted into secondary tank 120 through water input line 170 and then passage therethrough in secondary conduit 110. Preheating of the initial saltwater solution in secondary tank 120 is attained prior to insertion of the initially heated water 92 into vertically directed primary tank 40. This step of preheating further includes the passage of the initial saltwater solution in heat exchange relationship to the steam 180 which enters the secondary tank 120 through primary conduit 100. Thus, the steam 180 being in heat transport relation with secondary conduit 110 cools to allow the condensate within condensation zone 200 to change phase to a liquid and collects in purified water zone 140. Simultaneously, the heat transport between the steam 180 being condensed in condensation zone 200 permits the preheating of the initial saltwater solution passing through secondary conduit 110.

Although this invention has been described in connection with specific forms and embodiments thereof, it will be appreciated to those skilled in the art that various modifications other than those described above may be resorted to without departing from the spirit or scope of the invention. For example, functionally equivalent elements may be substituted for those specifically shown and described, proportional quantities of the elements shown and described may also be varied and in the formation of the method steps described, particular steps may be reversed or interposed, all without departing from the spirit or scope of the invention as defined in the appended claims.

What is claimed is:

1. A desalinization method for purifying water including the steps of:
    (a) establishing a vertically directed primary tank containing a heated silicone composition within a silicone heating zone of said primary tank;
    (b) charging said vertically directed primary tank with a preheated saltwater solution within said silicone heating zone at an upper section of said vertically directed primary tank;
    (c) passing said preheated saltwater solution through a heated silicone composition in said silicone heating zone by gravity assist to an initially heated saltwater zone within a lower section of said vertically directed primary tank, said preheated saltwater solution in the silicone heating zone maintaining direct immiscible contact with said heated silicone composition for heating thereby;
    (d) fluidly driving said initially heated saltwater solution in said initially heated saltwater zone to return via a heating conduit back through said silicone heating zone to produce steam; and
    (e) condensing said steam to produce purified water.

2. The desalinization method as recited in claim 1 where the step of fluidly driving said initially heated saltwater solution includes the step of charging said silicone heating zone with a heated silicone composition.

3. The desalinization method as recited in claim 2 where the step of charging said silicone heating zone includes the step of heating said silicone composition to a temperature approximately 235° F.

4. The desalinization method as recited in claim 3 where the step of heating said silicone composition includes the step of feeding back a portion of the silicone composition from said silicone heating zone to a silicone boiler.

5. The desalinization method as recited in claim 4 where the step of heating includes the step of establishing a silicone boiler external to said primary tank.

6. The desalinization method as claimed in claim 1 where the step of charging includes the step of:
    preheating an initial saltwater solution in a secondary tank prior to insertion of said initial saltwater solution into said vertically directed primary tank.

7. The desalinization method as recited in claim 6 where the step of preheating said initial saltwater solution includes the step of passing said initial saltwater solution in heat exchange relation to said steam entering said secondary tank.

8. The desalinization method as recited in claim 7 where the step of passing said steam in heat exchange relation to said initial saltwater solution includes the steps of:
 (a) collecting said condensed purified water in a lower section of said secondary tank within a purified water zone of said secondary tank; and,
 (b) selectively removing said condensed purified water from said secondary tank.

9. The desalinization method as recited in claim 1 wherein the step of establishing said vertically primary tank containing said heated silicone composition includes the steps of:
 (a) establishing a silicone heater for heating said silicone composition; and,
 (b) charging said heated silicone composition into said silicone heating zone within said vertically directed primary tank.

10. The desalinization method as recited in claim 9 including the further step of recycling heated silicone composition within said silicone heating zone to said silicone heater.

11. The desalinization method as recited in claim 9 wherein the step establishing the silicone heater includes the step of locating said silicone heater external to said vertically directed primary tank.

12. The desalinization method of claim 1 wherein the kinematic viscosity of said heated silicone within said silicone heating zone is within the approximate range of 100-1000 centi-stokes.

13. The desalinization method of claim 1 wherein the step of fluidly driving said heated saltwater solution includes the step of heating said saltwater solution above the boiling point temperature of water.

* * * * *